United States Patent
Baker et al.

(10) Patent No.: US 9,611,041 B2
(45) Date of Patent: Apr. 4, 2017

(54) PASSENGER SEAT HEADREST

(71) Applicant: B/E AEROSPACE, INC., Wellington, FL (US)

(72) Inventors: Cameron Baker, London (GB); Martin Darbyshire, London (GB)

(73) Assignee: B/E AEROSPACE, INC., Wellington, FL (US)

( * ) Notice: Subject to any disclaimer, the term of this patent is extended or adjusted under 35 U.S.C. 154(b) by 0 days.

(21) Appl. No.: 15/072,535

(22) Filed: Mar. 17, 2016

(65) Prior Publication Data
US 2016/0272327 A1  Sep. 22, 2016

Related U.S. Application Data (60) Provisional application No. 62/135,795, filed on Mar. 20, 2015.

(51) Int. Cl.
| | | |
|---|---|---|
| *A47C 1/10* | (2006.01) | |
| *B64D 11/06* | (2006.01) | |
| *B60N 2/48* | (2006.01) | |

(52) U.S. Cl.
CPC ........ *B64D 11/0642* (2014.12); *B60N 2/4882* (2013.01); *B64D 11/06* (2013.01); *B64D 11/0646* (2014.12)

(58) Field of Classification Search
CPC .......................... B64D 11/0642; B60N 2/4882
USPC ................................................. 297/391, 406
See application file for complete search history.

(56) References Cited

U.S. PATENT DOCUMENTS

| | | | | |
|---|---|---|---|---|
| 57,926 A | * | 9/1866 | LaFrance et al. ... | B60N 2/4882 27/25.1 |
| 3,226,159 A | * | 12/1965 | Binding ............... | B60N 2/4879 297/397 |
| 5,868,471 A | * | 2/1999 | Graham ................ | A47C 7/383 297/391 |
| 6,123,389 A | * | 9/2000 | O'Connor ............. | A47C 7/383 297/397 |
| 6,139,106 A | * | 10/2000 | Aldridge .............. | A61G 15/125 297/391 |
| 6,513,871 B2 | * | 2/2003 | Bartels ................. | B60N 2/4808 297/216.12 |

(Continued)

FOREIGN PATENT DOCUMENTS

| | | | | |
|---|---|---|---|---|
| DE | 102011121120 B3 | * | 6/2013 | .......... B60N 2/4882 |
| WO | 2007076536 A1 | | 7/2007 | |
| WO | 2012135245 A2 | | 10/2012 | |

OTHER PUBLICATIONS

International Search Report and Written Opinion of corresponding International Application No. PCT/US2016/022783; mailed Jun. 9, 2016; 13 pages.

*Primary Examiner* — Laurie K Cranmer
(74) *Attorney, Agent, or Firm* — Gardella Grace P.A.

(57) ABSTRACT

A seat headrest is provided that includes a mounting plate for attachment to a seat back of the seat. First and second side wings are mounted on opposite ends of the mounting plate. The side wings are mounted for pivotal movement between a retracted position against the mounting plate and a deployed position extending outwardly away from the mounting plate, and for sliding movement between the retracted position against the mounting plate and a further deployed position extending outwardly away from the mounting plate.

15 Claims, 6 Drawing Sheets

(56) References Cited

U.S. PATENT DOCUMENTS

| | | | | |
|---|---|---|---|---|
| 6,601,804 | B2* | 8/2003 | Bisch | A47C 7/383 248/118 |
| 6,669,143 | B1* | 12/2003 | Johnson | B64D 11/06 244/118.6 |
| 6,692,071 | B2* | 2/2004 | Fowler | B60N 2/4235 297/216.12 |
| 6,893,094 | B2* | 5/2005 | O'Connor | A47C 7/383 297/397 |
| 7,040,705 | B2* | 5/2006 | Clough | A47C 7/38 297/391 |
| 7,080,886 | B2* | 7/2006 | Bauer | A47C 7/38 297/217.6 |
| 7,093,903 | B2* | 8/2006 | O'Connor | A47C 7/383 297/397 |
| 7,264,313 | B2* | 9/2007 | Clough | A47C 7/38 297/406 |
| 7,744,158 | B2* | 6/2010 | Schurg | B60N 2/4882 297/391 |
| 8,898,840 | B1* | 12/2014 | Majette | A47C 7/383 297/393 |
| 8,911,020 | B2* | 12/2014 | Westerink | B64D 11/06 297/406 |
| 2004/0007910 | A1* | 1/2004 | Skelly | A47C 7/38 297/406 |
| 2009/0309346 | A1* | 12/2009 | Van Druff | B60N 2/4805 280/806 |

* cited by examiner

PASSENGER SEAT HEADREST

CROSS-REFERENCE TO RELATED APPLICATIONS AND PRIORITY

The present application claims priority from U.S. Provisional Application No. 62/135,795, filed Mar. 20, 2015, the contents of which are hereby incorporated in the entirety.

TECHNICAL FIELD AND BACKGROUND OF THE INVENTION

This application relates to a passenger seat headrest that provides more adjustability and comfort, particularly to passengers seating in the main cabin of an aircraft in economy seating. Conventional headrests on economy seats typically offer up and down height adjustment to permit size accommodation for passengers of differing heights, and hinged side wings on the left and right sides to provide head support. Some economy seating headrests also tilt forward slightly to support the head in a reclined position.

The degree of support that can be offered from conventional headrests is therefore constrained by three elements—the width of the side wings of the headrest, the distance between the hinges on the side wings, and the total width of the seat back, which is defined by the fit to the cabin sidewall. These limitations place restrictions on the comfort offered by the headrest as the limits on the adjustability, support and the distance between the side wings keeps the passengers head in a more vertical position which many passengers find uncomfortable when sleeping or resting.

SUMMARY OF THE INVENTION

It is therefore an object of the invention to provide an improved support to the head of a passenger by means of a mechanism that enables the side wings of the headrest to be moved further apart, extend out further from the back of the seat and offer a more acute angle of support.

It is another object of the invention to provide a headrest with the features identified above that still fits within the width of a standard economy seat when in its normal position flat to the seat back.

These and other objects and advantages of the present invention are achieved in the preferred embodiment disclosed below by providing a seat headrest that includes a mounting plate for attachment to an upper end of a seat back of the seat and first and second slide assemblies mounted in spaced-apart relation on the mounting plate. First and second head-supporting side wings are mounted on respective ones of the first and second slides for supporting a seat occupant's head against one of the first and second head-supporting side wings and for sliding movement between a relatively narrow spaced-apart position and a relatively wide spaced-apart position. First and second hinges are provided on which the first and second head-supporting side wings are respectively mounted for pivotal movement between a retracted position against the mounting plate and a deployed head-supporting position extending outwardly away from the mounting plate independent of the sliding movement of the first and second head-supporting side wings. First and second support arms are positioned on the mounting plate and support the respective first and second head-supporting side wings in a pre-determined angular head-supporting adjusted position and in a pre-determined spaced-apart position relative to the first and second slides.

According to another embodiment of the invention, the headrest includes first and second roller assemblies carried by respective first and second head-supporting side wings and adapted to permit low-friction sliding movement of the first and second head-supporting side wings on the respective first and second slide assemblies.

According to another embodiment of the invention, the headrest includes first and second slide hinge arms mounted for hinged pivoting movement relative to the respective first and second support arms.

According to another embodiment of the invention, wherein the first and second slide assemblies are mounted on the mounting plate at an oblique angle whereby the side wings lower as they move apart and raise as they move together.

According to another embodiment of the invention, wherein the first and second side wings each comprise a rigid plate.

According to another embodiment of the invention, the headrest includes first and second flexible membranes stretched between respective first and second side wings and a central portion of the mounting plate between the first and second side wings.

According to another embodiment of the invention, the headrest includes first and second curved, padded tongues attached to the respective side wings and a central portion of the mounting plate between the first and second side wings.

According to another embodiment of the invention, wherein the first and second support arms are positioned on the mounting plate and extend outwardly and engage the respective side wings at an oblique angle that varies as the first and second side wings slide along the respective slide assemblies.

According to another embodiment of the invention, the headrest includes first and second curved, padded tongues attached to the respective side wings and a central portion of the mounting plate between the first and second side wings, the first and second curved, padded tongues extending along an inward-facing surface of the respective first and second side wings and wrapping around respective distal ends of the respective first and second side wings.

According to another embodiment of the invention, a seat headrest is provided that includes a mounting plate for attachment to an upper end of a seat back of the seat and first and second slide assemblies mounted in spaced-apart relation on the mounting plate. First and second head-supporting side wings are mounted on respective ones of the first and second slides for supporting a seat occupant's head against one of the first and second head-supporting side wings for sliding movement between a relatively narrow spaced-apart position and a relatively wide spaced-apart position. First and second roller assemblies are carried by the respective first and second head-supporting side wings and adapted to permit low-friction sliding movement of the first and second head-supporting side wings on the respective first and second slide assemblies. First and second hinges are provided on which the first and second head-supporting side wings are respectively mounted for pivotal movement between a retracted position against the mounting plate and a deployed head-supporting position extending outwardly away from the mounting plate independent of the sliding movement of the first and second head-supporting side wings. First and second support arms are positioned on the mounting plate and support the respective first and second head-supporting side wings in a pre-determined angular head-supporting adjusted position and in a pre-determined spaced-apart position relative to the first and second slides. First and second slide hinge arms are mounted for hinged pivoting movement relative to the respective first and second support arms.

According to another embodiment of the invention, the first and second slide assemblies are mounted on the mounting plate at an oblique angle whereby the side wings lower as they move apart and raise as they move together.

According to another embodiment of the invention, the headrest includes the first and second side wings each comprise a rigid plate.

According to another embodiment of the invention, the headrest includes first and second curved, padded tongues attached to the respective side wings and a central portion of the mounting plate between the first and second side wings, the first and second curved, padded tongues extending along an inward-facing surface of the respective first and second side wings and wrapping around respective distal ends of the respective first and second side wings.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT AND BEST MODE

Figure 1:
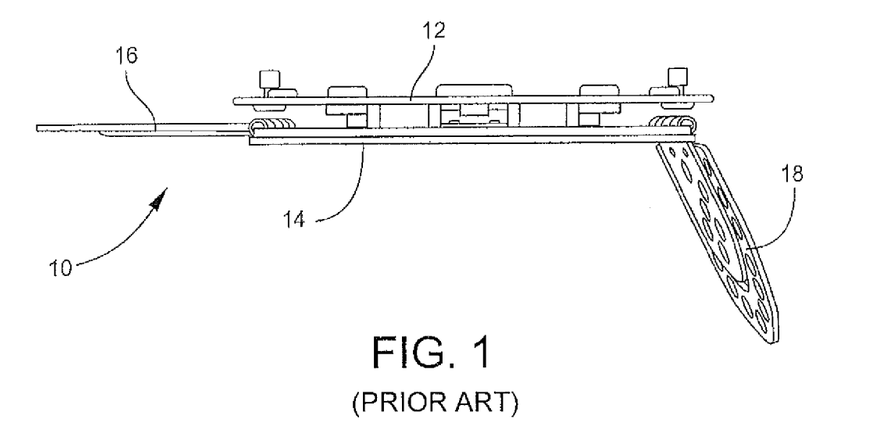
FIG. 1 is a top plan view of a prior art seat back headrest.

Referring now to the drawings, the underlying frame of a conventional prior art aircraft passenger seat headrest 10 of the type used on economy seating is shown in FIG. 1. A mounting plate 12 attaches a central support 14 to the top of a passenger seat back, not shown. Hinged side wings 16 and 18, which are planar, are mounted on opposite ends of the central support 14 and can be folded back into a retracted position, as with wing 16, or folded forward into a deployed, use position, as with wing 18.

Figure 2:
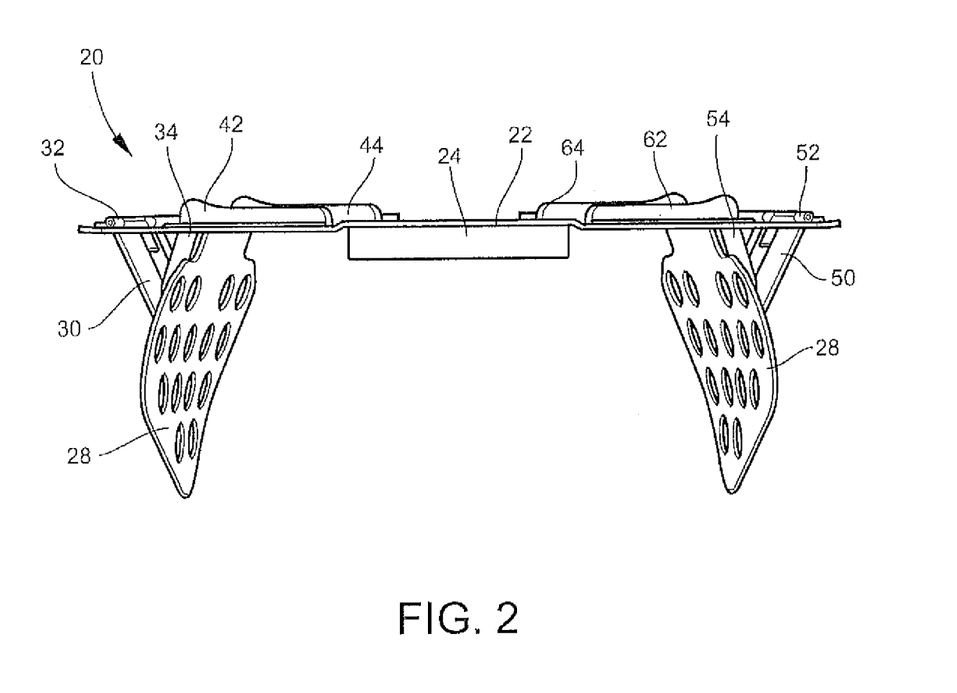
FIG. 2 is a top plan view of a headrest according to one embodiment of the invention.
Figure 3:
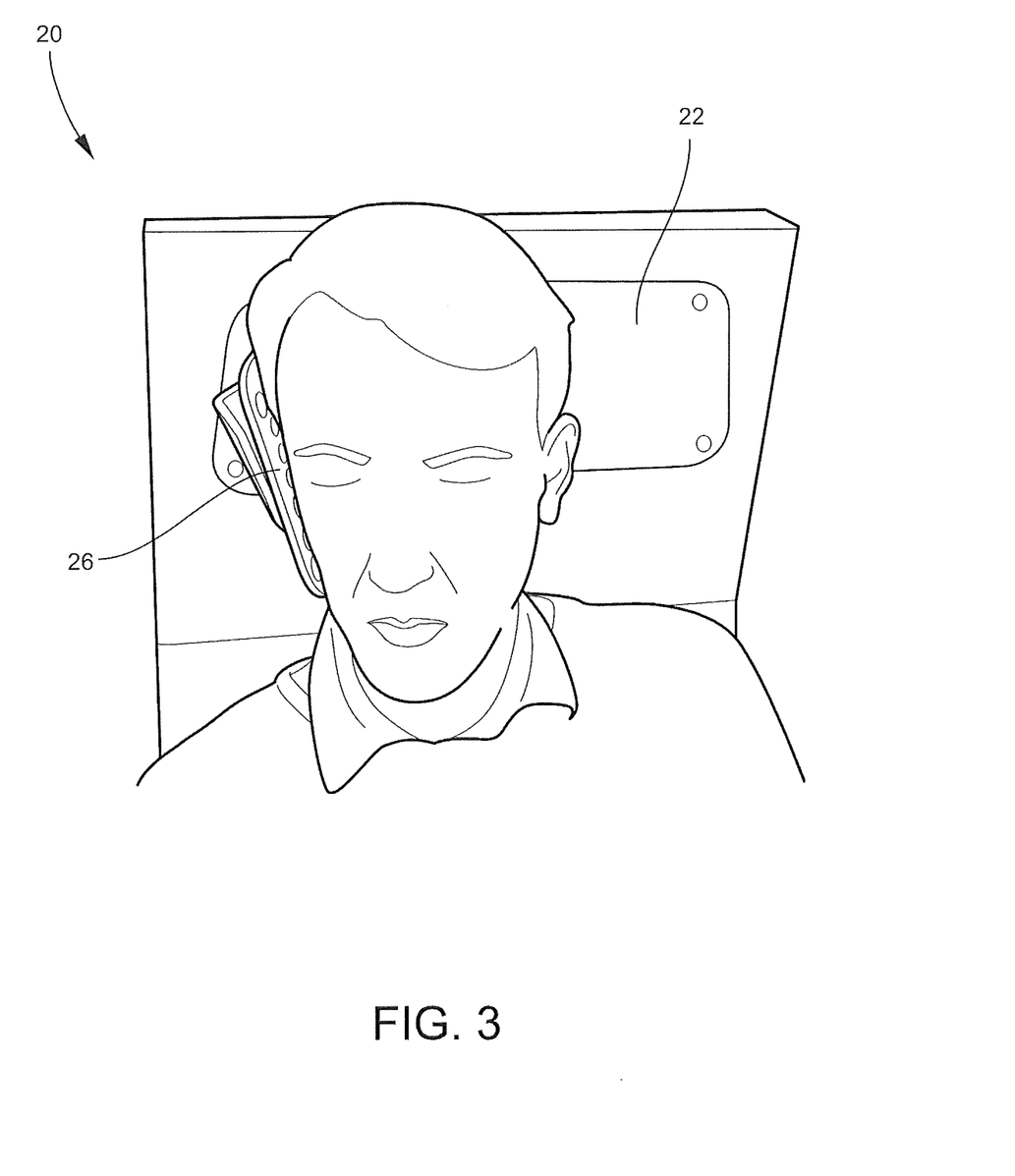
FIG. 3 is an environmental view showing a headrest according to one embodiment of the invention.

In contrast, the headrest 20, according to the invention shown in FIGS. 2-7 provide greater adjustment and comfort. As shown in FIG. 2, the headrest 20 includes a mounting plate 22 that attaches to a seat back, not shown. Also not shown is a conventional vertical slide assembly which permits the headrest 20 to move up and down relative to the seat back. A central support 24 is carried by the mounting plate 22, as are a pair of headrest side wings 26, 28. The wing 26 is carried on a support arm 30 mounted on the mounting plate 22 by a hinge 32. A slide hinge arm 34 is mounted for hinged movement relative to the support arm 30 by a hinge 36. When the wing 26 is fully retracted, the support arm 30 and slide hinge arm 34 are unfolded and reside in substantially the same longitudinal plane, and when the wing 26 is fully deployed, the support arm 30 and slide hinge arm 34 form a common angle from the hinge 36.

Figure 4:
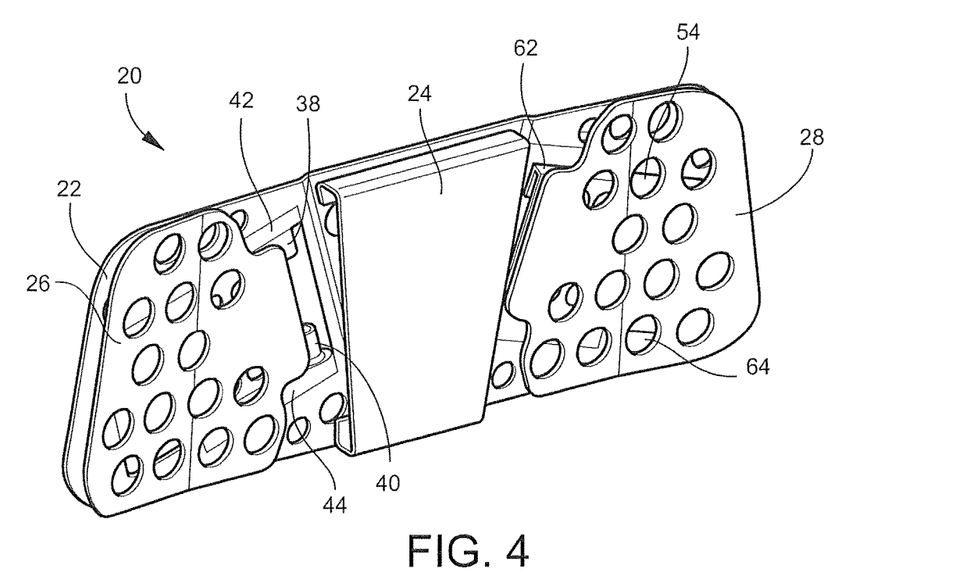
FIGS. 4 and 5 are views of the headrest of FIGS. 2 and 3 in a retracted position and deployed position, respectively.

Upper and lower rollers 38, 40 are carried on the end of the slide hinge arm 34 and are mounted in respective upper and lower slide rails 42, 44 to allow the wing 26 to move incrementally between the deployed position shown in, for example, FIG. 2 and the retracted position shown, for example in FIG. 4.

Similarly, the wing 28 is carried on a support arm 50 mounted on the mounting plate 22 by a hinge 52. A slide hinge arm 54 is mounted for hinged movement relative to the support arm 30 by a hinge 56. Upper and lower rollers 58, 60 are carried on the end of the slide hinge arm 54 and are mounted in respective upper and lower slide rails 62, 64 to allow the wing 28 to move incrementally between the deployed position shown in, for example, FIGS. 2 and 5, and the retracted position shown, for example in FIG. 4.

Figure 5:
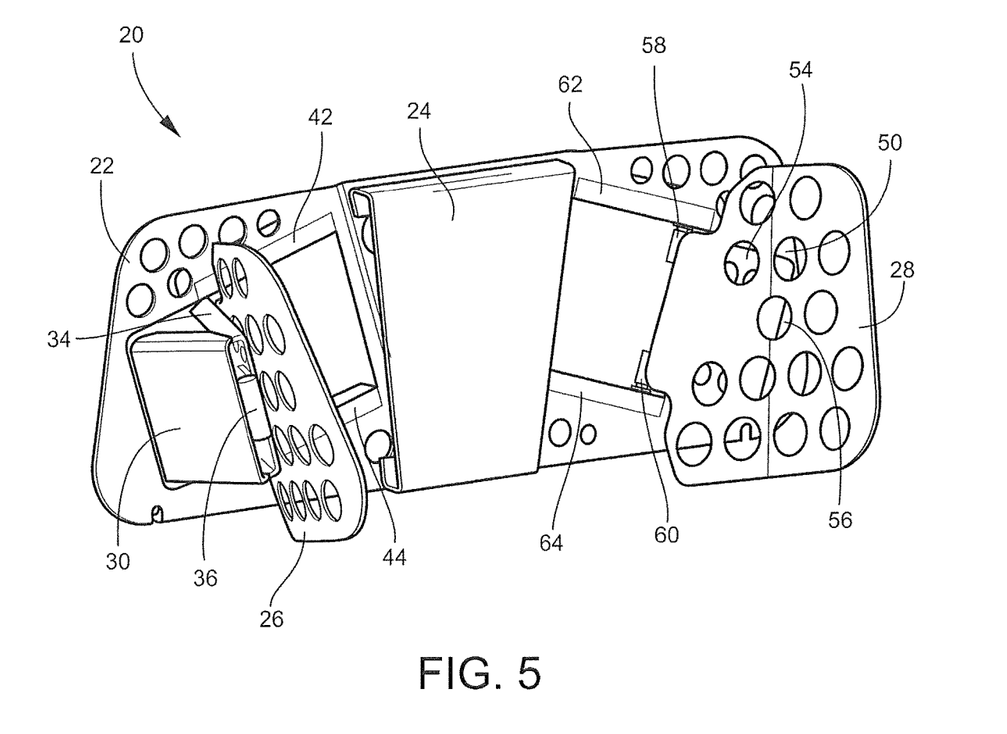
Figure 6:
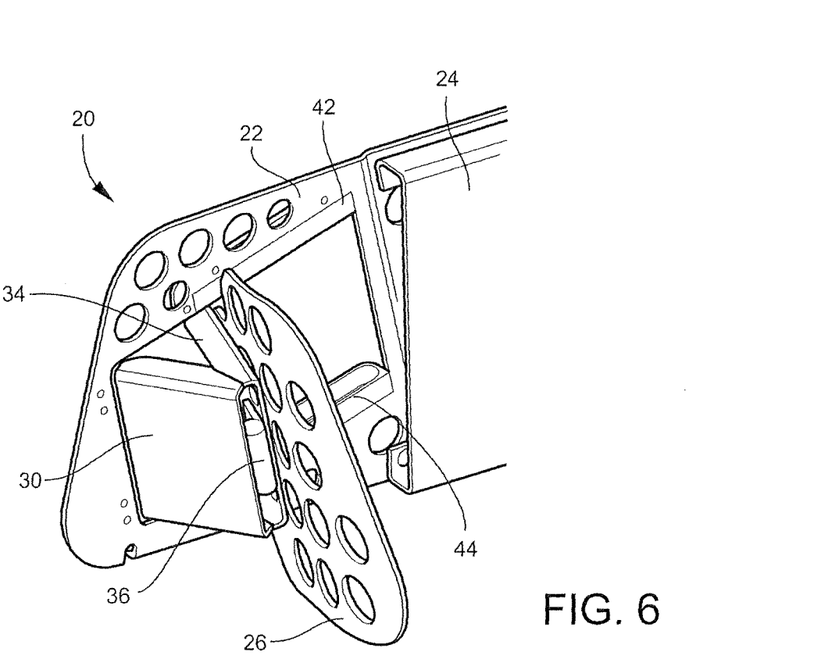
FIG. 6 is detailed perspective view of the deployed position of the headrest of FIG. 5.
Figure 7:
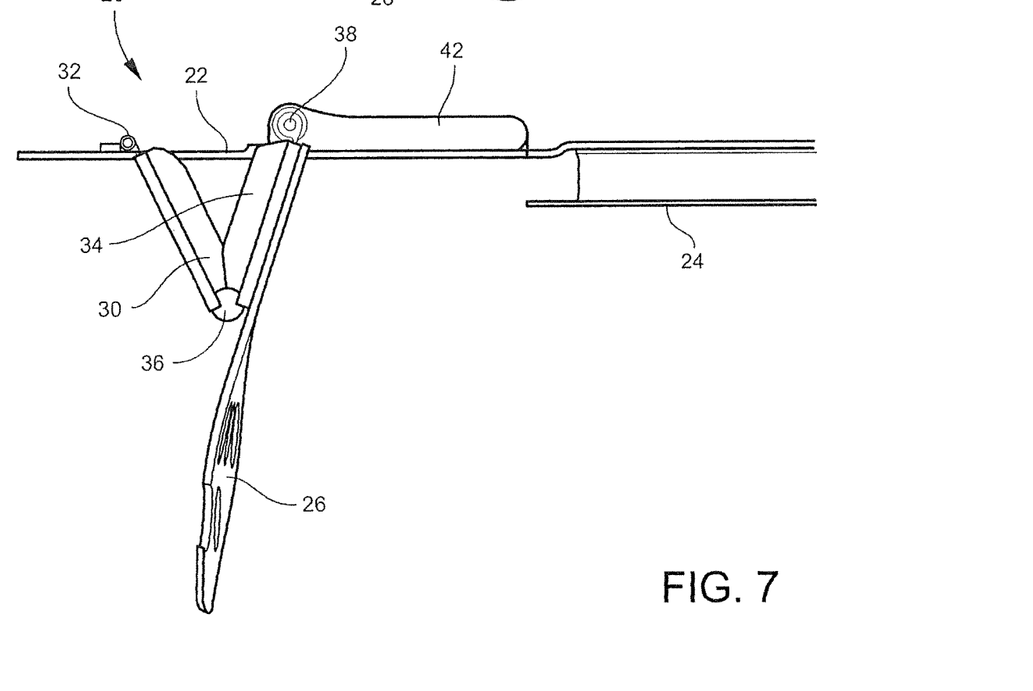
FIG. 7 is a top plan view of the deployed headrest of FIGS. 5 and 6.

The headrest 20 offers a 30% increase in the distance the side wings 26, 28 than prior art headrests, a 4% increase in the angle of the side wings 26, 28 in relation to the mounting plate 22, and a 30% increase in the distance that the side wings 26, 28 can be extended forward into the deployed position of FIGS. 2, 5 and 6.

Referring now to FIGS. 8-11, two alternative headrest embodiments are described, wherein reference numbers in common with the headrest 20 represent the identical components.

Figure 8:
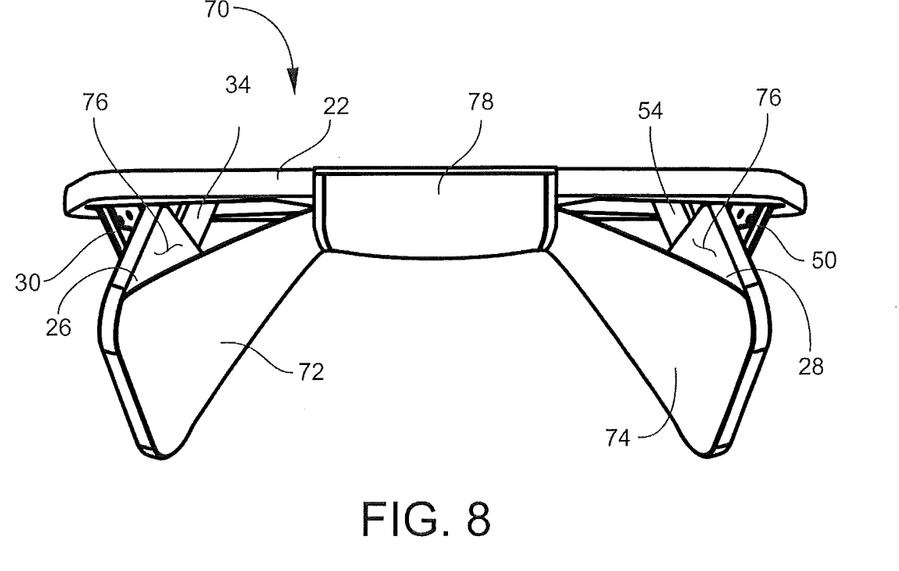
FIG. 8 is front perspective view of an alternative embodiment of the headrest according to the invention.
Figure 9:
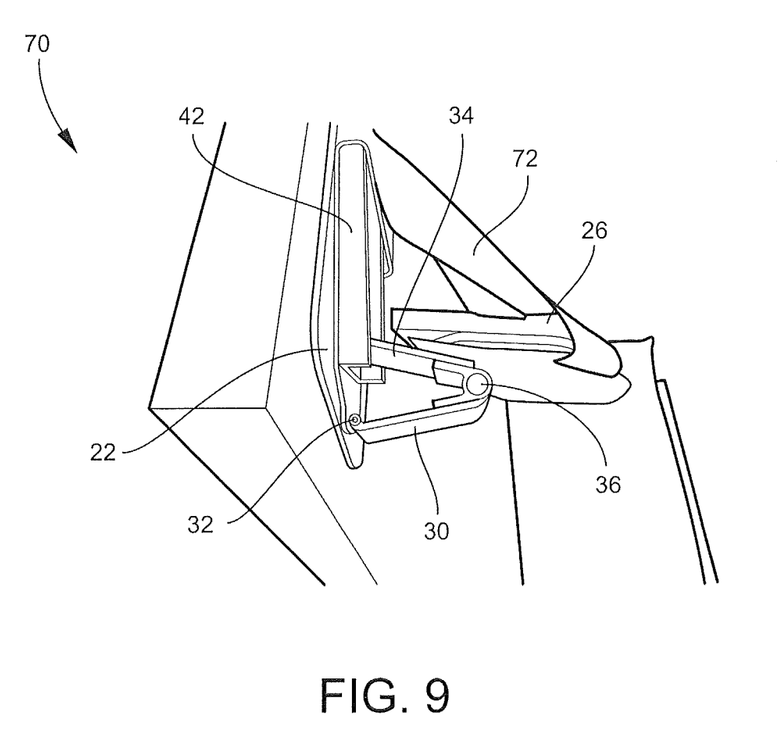
FIG. 9 is a fragmentary top perspective view of the headrest of FIG. 8.

The headrest 70 of FIGS. 8 and 9 include flexible membrane 72, 74 stretched between each of the side wings 26, 28 which are covered with a suitable padding 76, and the padded headrest bridge 78.

Figure 10:
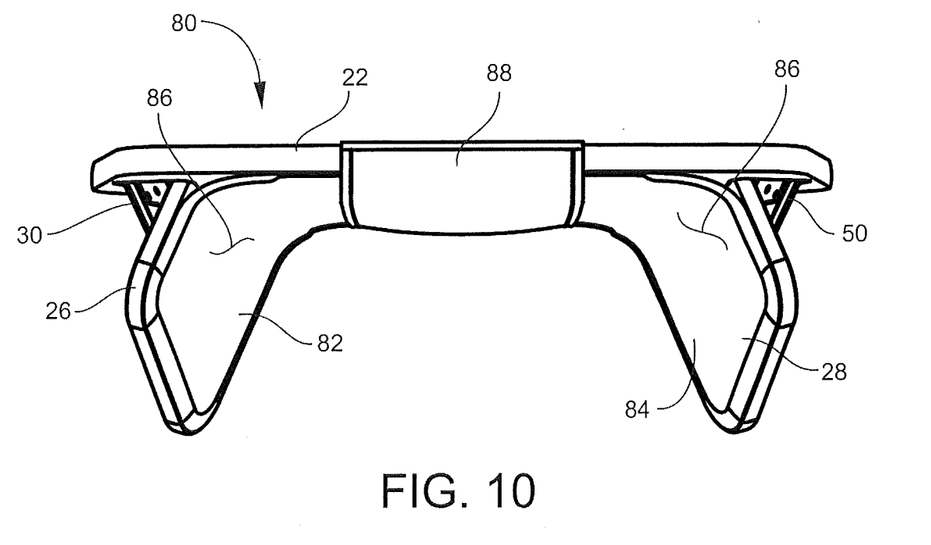
FIG. 10 is front perspective view of a further alternative embodiment of the headrest according to the invention.
Figure 11:
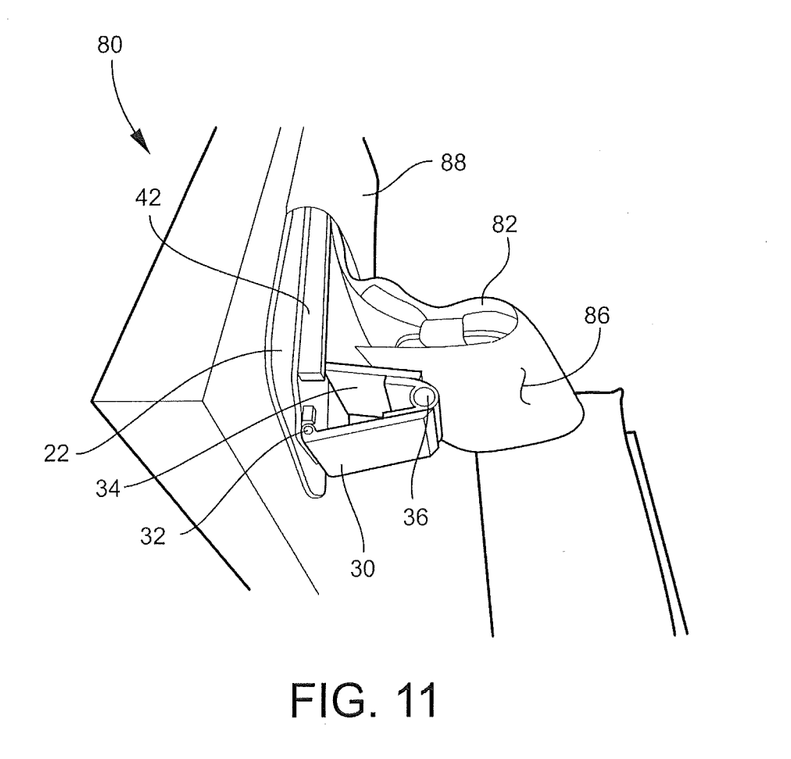
FIG. 11 is a fragmentary top perspective view of the headrest of FIG. 10.

The headrest 80 of FIGS. 10 and 11 include flexible tongues 82, 84 that are attached to respective side wings 26, 28, covered with a suitable padding 86 of the headrest 80, and that slide under the padded headrest bridge 88.

As a result of the headrest structures 20, 70 and 80 described above, the hinging and sliding mechanism facilitates better support for the head and, in so doing, gives greater comfort, the side wings of the headrests can be larger and longer, move further outwards into the deployed position, and offer increased angular support to the head. Notwithstanding the enhanced comfort and support offered, the side wings 26, 28 of the headrests 20, 70 and 80 can still be stowed within the width of the seat back in the 'normal' position, as shown in FIG. 4. It is also possible for the headrests 20, 70 and 80 to be used in applications other than economy aircraft seats where improved comfort is desirable, but where the headrest is required to fit within in a shallow depth. The headrests 20, 70 and 80 can be mounted on a rotating base plate, with a feature to lock it at different angles, to provide a range of angle of support to the side of the head.

An aircraft passenger seat headrest according to several embodiments is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A seat headrest, comprising:
   (a) a mounting plate for attachment to an upper end of a seat back of the seat;

(b) first and second slide assemblies mounted in spaced-apart relation on the mounting plate;

(c) first and second head-supporting side wings mounted on respective ones of the first and second slide assemblies for supporting a seat occupant's head against one of the first and second head-supporting side wings and for sliding movement between a relatively narrow spaced-apart position and a relatively wide spaced-apart position, the first and second slide assemblies mounted on the mounting plate at an oblique angle whereby the first and second head-supporting side wings lower as they move apart and raise as they move together;

(d) first and second hinges on which the first and second head-supporting side wings are respectively mounted for pivotal movement between a retracted position against the mounting plate and a deployed head-supporting position extending outwardly away from the mounting plate independent of the sliding movement of the first and second head-supporting side wings; and (e) first and second support arms positioned on the mounting plate and supporting the respective first and second head-supporting side wings in a pre-determined angular head-supporting adjusted position and in a pre-determined spaced-apart position relative to the first and second slide assemblies.

2. The seat headrest according to claim 1, and including first and second roller assemblies carried by respective first and second head-supporting side wings and adapted to permit low-friction sliding movement of the first and second head-supporting side wings on the respective first and second slides.

3. The headrest according to claim 2, and including first and second slide hinge arms mounted for hinged pivoting movement relative to the respective first and second support arms.

4. The headrest according to claim 1, wherein the first and second side wings each comprise a rigid plate.

5. The headrest according to claim 1, including first and second flexible membranes stretched between respective first and second side wings and a central portion of the mounting plate between the first and second side wings.

6. The headrest according to claim 1, including first and second curved, padded tongues attached to the respective side wings and a central portion of the mounting plate between the first and second side wings.

7. The headrest according to claim 1, wherein the first and second support arms are positioned on the mounting plate and extend outwardly and engage the respective side wings at an oblique angle that varies as the first and second side wings slide along the respective slide assemblies.

8. The headrest according to claim 1, and including first and second curved, padded tongues attached to the respective side wings and a central portion of the mounting plate between the first and second side wings, the first and second curved, padded tongues extending along an inward-facing surface of the respective first and second side wings and wrapping around respective distal ends of the respective first and second side wings.

9. A seat headrest, comprising:

(a) a mounting plate for attachment to an upper end of a seat back of the seat;

(b) first and second slide assemblies mounted in spaced-apart relation on the mounting plate;

(c) first and second head-supporting side wings mounted on respective ones of the first and second slide assemblies for supporting a seat occupant's head against one of the first and second head-supporting side wings and for sliding movement between a relatively narrow spaced-apart position and a relatively wide spaced-apart position;

(d) first and second roller assemblies carried by the respective first and second head-supporting side wings and adapted to permit low-friction sliding movement of the first and second head-supporting side wings on the respective first and second slide assemblies;

(e) first and second hinges on which the first and second head-supporting side wings are respectively mounted for pivotal movement between a retracted position against the mounting plate and a deployed head-supporting position extending outwardly away from the mounting plate independent of the sliding movement of the first and second head-supporting side wings;

(f) first and second support arms positioned on the mounting plate and supporting the respective first and second head-supporting side wings in a pre-determined angular head-supporting adjusted position and in a pre-determined spaced-apart position relative to the first and second slide assemblies; and (g) first and second slide hinge arms mounted for hinged pivoting movement relative to the respective first and second support anus.

10. The headrest according to claim 9, wherein the first and second slide assemblies are mounted on the mounting plate at an oblique angle whereby the side wings lower as they move apart and raise as they move together.

11. The headrest according to claim 9, wherein the first and second side wings each comprise a rigid plate.

12. The headrest according to claim 9, including first and second flexible membranes stretched between respective first and second side wings and a central portion of the mounting plate between the first and second side wings.

13. The headrest according to claim 9, including first and second curved, padded tongues attached to the respective side wings and a central portion of the mounting plate between the first and second side wings.

14. The headrest according to claim 9, wherein the first and second support arms are positioned on the mounting plate and extend outwardly and engage the respective side wings at an oblique angle that varies as the first and second side wings slide along the respective slide assemblies.

15. The headrest according to claim 9, and including first and second curved, padded tongues attached to the respective side wings and a central portion of the mounting plate between the first and second side wings, the first and second curved, padded tongues extending along an inward-facing surface of the respective first and second side wings and wrapping around respective distal ends of the respective first and second side wings.

\* \* \* \* \*